United States Patent Office 3,269,539
Patented August 30, 1966

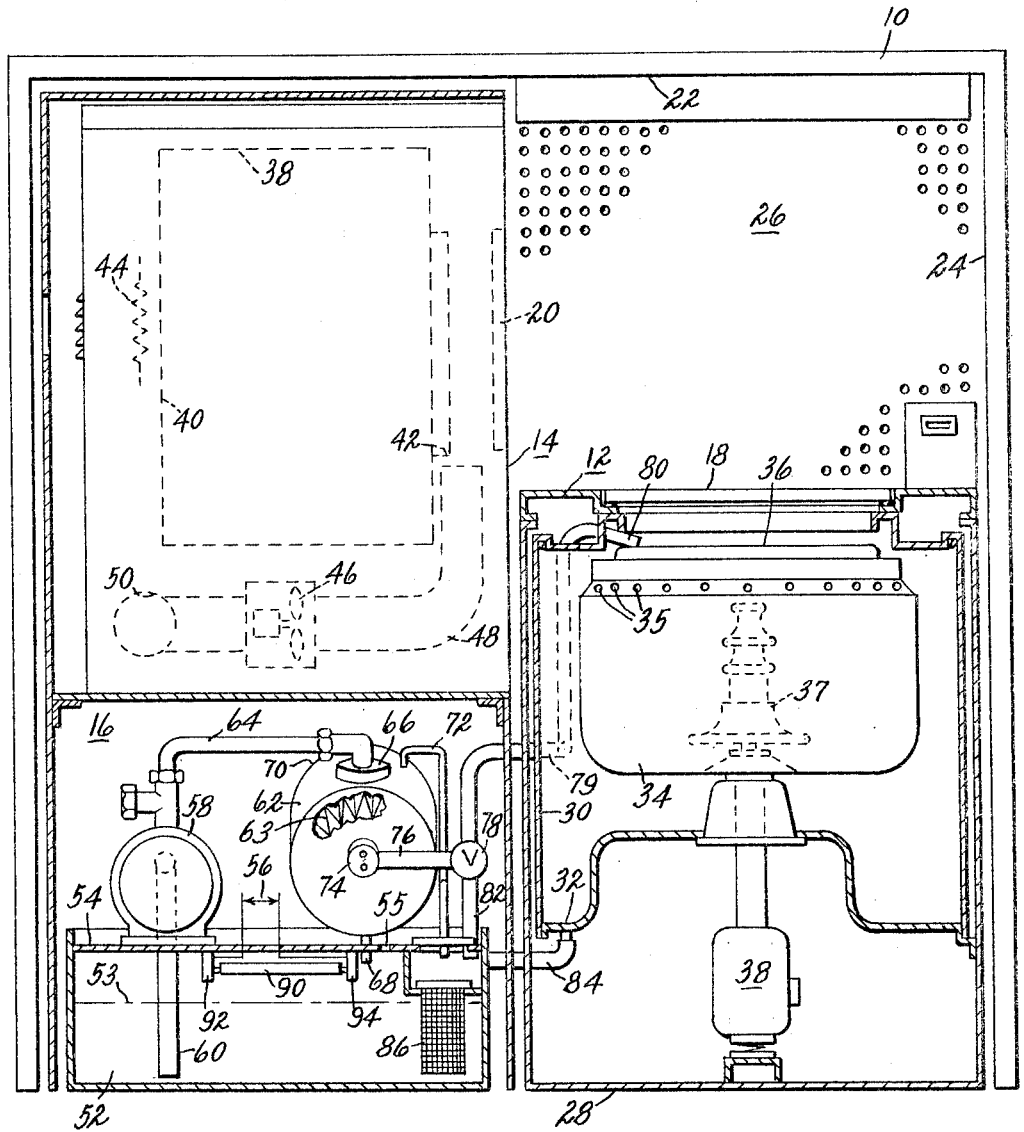

3,269,539
APPARATUS AND METHOD FOR CONDITIONING DRY CLEANING SOLVENT
Byron L. Brucken and Victor A. Williamitis, Dayton, Ohio, assignors to General Motors Corporation, Detroit, Mich., a corporation of Delaware
Filed Feb. 19, 1964, Ser. No. 345,986
10 Claims. (Cl. 210—70)

This invention relates to improved dry cleaning apparatus and more particularly to an improved method of treating solvent and/or to a solvent circulating system including means for changing fugitive dyes in the solvent to colorless products.

When clothes are cleaned in solvent, soil in the form of particulate matter is released from the clothes to the solvent as well as some of the fabric coloring matter, this latter existing as fugitive dyes dissolved in the solvent and circulating therewith. If not removed, the dissolved dyes will redeposit on the clothes and impair the cleaning results. In the commonly assigned copending application, Ser. No. 285,189, filed May 27, 1963, now Patent No. 3,132,501, a replaceable filter cartridge type of dry cleaning apparatus is disclosed, wherein the filter cartridge includes filter paper for removing particulate matter from the circulating solvent and activated carbon for adsorbing dyes from the circulating solvent. Granular carbon fines have a tendency to escape from the cartridge into the solvent where they may smudge the clothing being cleaned. This invention is directed to an improvement thereover wherein carbon is eliminated and the fugitive dyes are altered into colorless products by means of ultraviolet light with the filter cartridge serving only to remove particulate matter.

Accordingly, it is an object of this invention to provide a solvent circulating system for a clothes dry cleaner including ultraviolet light means to decompose the soluble dye pigments in the solvent to colorless products.

A further object of this invention is the provision of a solvent circulating system for a clothes dry cleaner including a removable and disposable filter cartridge for filtering particulate matter from the circulating solvent and a photochemical lamp or other ultraviolet radiation device for bleaching dissolved dyes and pigments in the solvent to colorless products.

A further object of this invention is the provision of a photochemical lamp or other ultraviolet radiation device in the solvent reservoir of a dry cleaning solvent circulating system to decolorize the solvent therein.

A general object of this invention is the provision of a method for continuously decolorizing circulating solutions by ultraviolet radiation.

Further objects and advantages of the present invention will be apparent from the following description, reference being had to the accompanying drawing wherein a preferred embodiment of the present invention is clearly shown.

In the drawing:

Shown is a front sectional view, partly in elevation and with parts broken away, of a dry cleaning apparatus suitable for use with this invention.

Suitable for use with this invention and turning now to the drawing, a unitary dry cleaning system or apparatus of the replaceable filter cartridge type is illustrated. The system includes an outer cabinet 10 for partially enclosing a clothes cleaner or agitating apparatus 12 and a clothes dryer or drying apparatus 14. Note that the clothes dryer 14 is elevated above the floor to provide for a filter compartment 16 therebelow. The clothes cleaner 12 has a top access door 18 which is pivotally openable for inserting and removing fabrics from the cleaner.

The clothes dryer 14 has a front access door 20 which faces the washer access door 18 adjacent one side thereof. This arrangement places the access doors 18 and 20 in a confined area defined by a top wall 22 and a side wall 24 of the dry cleaning cabinet 10—a perforate grille 26 at the rear of the confined space operating to withdraw fumes from the area. The outlet or vent grille 26 is connected to the atmosphere through an exhaust blower at the rear of the cabinet.

The cleaner or agitating apparatus 12 is shown comprised of an outer cabinet 28 in the top wall of which is located the access door 18, hinged along a rear edge thereof. Within the washer cabinet 28, a generally cylindrical, imperforate solvent container 30 is disposed which includes an access opening in axial alignment with the top access lid 18 of the washer. The lower end of the solvent container 30 includes a drain opening 32 draining the solvent container from a lowermost portion thereof. A generally cylindrical spin tub or container 34 is rotatably supported in the solvent container and includes a plurality of circumferentially arranged outflow ports 35 around an upper portion thereof and a top access opening 36 which aligns with the door 18 immediately above. Within the spin tub 34, an agitator 37 is adapted for vertical reciprocation. A motor-driven agitating and spinning mechanism is shown generally at 38 and is adapted to vertically reciprocate the agitator 37 when operated in one manner and to rotate or spin the tub 34 when rotated in another manner.

The clothes dryer 14 is a conventional, single pass, circulating air dryer substantially like that taught in the patent to Whyte 2,843,945, issued July 22, 1958. The dryer includes a horizontally rotatable tumbling drum or container 38 having a perforate rear wall 40 and a front access opening 42 in alignment with the dryer door 20. A drying heater 44 is disposed adjacent the perforate rear wall 40 of the tumbling drum and is adapted to be energized for drying clothes within the tumbling drum. During operation of the heater 44 and rotation of the tumbling drum 38, air is circulated by a fan 46 connected with the drum access opening 42 by way of a front duct 48, said front duct being exhausted to atmosphere by the fan through an exhaust duct 50.

The solvent circulating system for a dry cleaning fluid or solvent, such as perchlorethylene (a somewhat toxic dry cleaning fluid) or valclene (a nontoxic dry cleaning fluid made by the Du Pont Corporation which is essentially Freon 113) will now be described with reference to the drawing. The main components of the circulating system include a sump or solvent reservoir 52 containing solvent to a level 53 and having a top wall 54 with an air vent and spill-over return 55, thereby to substantially enclose the solvent and its vapor. If it is desired to control solvent temperature, a cooling coil (not shown) through which water or other cooling medium courses is immersed in the solvent, said water being thermostatically controlled to maintain the solvent at its best cleaning temperature. Above the sump top wall 54 is a pump 58 which has its inlet connected through a solvent suction dip tube 60 to the bottom of the sump 52. A filter 62 is adapted to receive the output of the pump through a conduit 64 which connects to the inlet 66 of the filter. The case of the filter 62, containing a throw away folded filter paper cartridge 63, is positioned angularly in the filter compartment 16, such that a gravity drain 68 extends through the sump wall 54 and includes a valve (not shown) manually openable to substantially drain the filter of solvent when the dry cleaning system is shut down. The closed rear end wall 70 of the filter case or chamber is removable as a service access to replace the filter cartridge 63. A solvent by-pass line 72 is provided at the highest part of the filter case to bleed air from the case. Unfiltered solvent passes through the by-pass line during operation of the filtration system and returns to the solvent reservoir.

At one end of the filter, an outlet fitting 74 connects by way of a solvent supply conduit 76 through a two-way or two-position valve 78 and supply conduit 79 to the tub access opening 36—a terminal portion 80 overlying the top of the spin tub 34. The two-position valve 78 may be controlled such as by a solenoid into a first position connecting the filter outlet 74 to the spin tub 34 and a second position connecting the filter outlet to a sump return line 82. Completing the circulating system is a conduit 84 which connects to the drain outlet 32 of the solvent container 30. This conduit 84 enters the sump 52 by way of a button trap 86, access to which is gained through a removable lid thereabove for cleaning.

The fluid circulation system operates as follows. The pump 58 draws dry cleaning fluid or solvent from sump 52 through the dip tube 60. This dry cleaning fluid, cleaned of large objects by the trap 86, is forced through the conduit 64 to the filter 62—the filter cartridge 63 being interposed in solvent flow intercepting relationship between the inlet 66 and outlet 74 and effective to remove small solids or particulate matter only from the dry cleaning fluid. After an initial period in which the two-position valve 78 returns the solvent to the sump, the valve is actuated to discharge the solvent from the filter by way of the conduit 76 and its end nozzle 80 into the spin tub 34. When the level of dry cleaning fluid within the tub reaches the outflow ports 35, the dry cleaning fluid will continue to overflow into the solvent container 30 during the agitate cycle and will return by gravity through the conduit 84 to the sump 52.

In the aforegoing equipment the removable filter cartridge 63 is effective to remove the particulate matter only from the circulating solvent. However, the cleaning of fabrics creates certain fugitive dyes which are carried along in the circulating solvent in a dissolved condition. In the prior art such dyes were removed by an adsorbent medium such as activated carbon included in the filter cartridge 63. The inclusion of the granular carbon as a part of the cartridge creates additional cost and also gives rise to the possibility that some of the fine carbon particles or granules may escape to the cleaning tub 34 and impair the cleaning results. This invention proposes to eliminate the carbon type of adsorption for removing dyes or the like through the use of a photochemical lamp 90 carried on supports 92, 94 on the under side of the sump top wall 54. Photochemical lamps designate a family of mercury lamps designed for specialized applications of ultraviolet radiation, such as the UVIARC lamp manufactured by the General Electric Corp. and designed for photochemical purposes. Such a photochemical lamp may be energized from a 110-volt source 56 and is adapted to operate continuously, consuming only small amounts of power on the order of 40 to 60 watts. The lamp 90, found particularly acceptable in this combination, is a photochemical lamp having an ultraviolet radiation of 2537 angstroms. In the instant dry cleaning system the lamp 90 is operated continuously in the sump above the solvent surface 53 to irradiate the solvent for decolorizing the fugitive dyes therein. It is also within the purview of this invention to submerge the photochemical lamp 90 in the solvent, either in the sump or in one of the conduits which carry the solvent to and from the tub 34.

This invention uses the continuous bleaching effects of ultraviolet radiation in combination with a replaceable filter cartridge which removes particulate matter only when solvent is being circulated. Note, however, that the entire solvent conditioning function can be made continuous by using the ultraviolet device in combination with a continuous particulate matter filtering process, such as a rotating helical tube centrifugal separator.

It should now be seen that an improved solvent conditioning method and/or apparatus has been provided wherein ultraviolet radiation is used for maintaining the clarity of the solvent by altering the fugitive dyes or the like to colorless products while a filtering device removes particulate matter from the circulating solvent.

While the embodiment of the present invention as herein disclosed constitutes a preferred form, it is to be understood that other forms might be adopted.

What is claimed is as follows:

1. In combination, a clothes cleaning apparatus having a vertical spin tub and means for agitating in said tub and spinning said tub, said cleaning apparatus including a solvent container for enclosing said spin tub and having a top access opening, means forming a filter compartment adjacent said cleaning apparatus and enclosing a sump, means forming a filter chamber having a closed end and a selectively openable service access end, a unitary replaceable filter cartridge insertable through said service access end into said chamber, said cartridge including means for filtering particulate matter only from solvent when solvent is circulating therethrough, inlet conduit means connecting said sump to said filter chamber on one side of said filter cartridge, supply conduit means connecting said filter chamber on the other side of said filter cartridge to said spin tub, pump means connected in pumping relationship to said inlet conduit means and said supply conduit means in a manner to effect flow from said inlet conduit means through said filter cartridge to said supply conduit means, return conduit means connecting the solvent container to said sump, whereby solvent is adapted for circulation from said sump through said filter cartridge to said spin tub for centrifugal release to said solvent container and gravity return to said sump, and means in continuous ultraviolet light irradiating relationship to solvent in said sump for continuously altering dissolved dye pigments in said solvent to colorless products irrespective of the circulation of said solvent.

2. The combination of claim 1 wherein said irradiating means is submerged in said solvent.

3. The combination of claim 1 wherein said irradiating means is spaced from said solvent.

4. The combination of claim 1 wherein said irradiating means is a photochemical lamp.

5. In combination, a clothes cleaning apparatus having a tub and means for agitating in said tub, said cleaning apparatus including a solvent container for at least partially enclosing said tub and having an access opening, means forming a filter compartment adjacent said cleaning apparatus and enclosing a sump, means forming a filter chamber having a closed end and a service access end, a unitary replaceable filter cartridge insertable through said service access end into said chamber, said cartridge including means for filtering particulate matter only in the solvent and only when said solvent is circulating therethrough, inlet conduit means connecting said sump to said filter chamber on one side of said filter cartridge, supply conduit means connecting said filter chamber on the other side of said filter cartridge to said tub, pump means connected in pumping relationship to said inlet conduit means and said supply conduit means in a manner to effect flow from said inlet conduit means through said filter cartridge to said supply conduit means, return conduit means connecting the solvent container to said sump, whereby solvent is adapted for circulation from said sump through said filter cartridge to said tub for subsequent release to said solvent container and return to said sump, and means separate from said cartridge and in ultraviolet light irradiating relationship to said solvent for continuously altering dissolved contaminants in said solvent to colorless products.

6. A clothes dry cleaning system comprising means forming a chamber for retaining a dry cleaning solvent during a cleaning period, means for directing said solvent to said chamber, and means for conditioning said solvent by removing particulate and non-particulate contaminants therefrom before said solvent is directed to said chamber, said conditioning means including first means for periodically filtering particulate contaminants only from said solvent and second means separate from said first means and acting directly on said solvent for continuously decolorizing non-particulate contaminants therein such as dissolved dye pigments or the like into colorless products.

7. The dry cleaning system of claim 6 wherein said second means is a photochemical lamp energizable to produce ultraviolet radiation substantially in the range of 2537 angstroms.

8. The dry cleaning system of claim 6 wherein said first means is a throw-away folded filter paper cartridge.

9. The method of conditioning dry cleaning solvent for use in a clothes dry cleaner or the like comprising the steps of conveying the solvent from a source of said solvent to the dry cleaner, periodically filtering said solvent before it is conveyed to said dry cleaner to remove particulate contaminants therefrom, and continuously decolorizing said solvent with ultraviolet radiation substantially in the range of 2537 angstroms before it is conveyed to said dry cleaner to alter dissolved contaminants such as fugitive dye pigments to colorless products.

10. The method of conditioning dry cleaning solvent for use in a cleaner comprising the steps of conveying the solvent from a source of said solvent to the cleaner, periodically removing particulate contaminants from said solvent before it is conveyed to said cleaner, and continuously irradiating said solvent before it is conveyed to said cleaner, thereby to alter dissolved contaminants to colorless products.

References Cited by the Examiner

UNITED STATES PATENTS

| | | | |
|---|---|---|---|
| 2,101,014 | 11/1937 | Angelus et al. | 68—18 X |
| 2,754,670 | 7/1956 | Lawson | 68—18 |
| 2,759,346 | 8/1956 | Beduhn | 68—18 |
| 2,979,375 | 4/1961 | Kircher et al. | 8—142 |
| 3,030,172 | 4/1962 | Edwards | 8—142 |
| 3,065,620 | 11/1962 | Houser | 68—13 |
| 3,110,170 | 11/1963 | Long | 68—12 |
| 3,130,570 | 4/1964 | Rentzepis | 68—13 |
| 3,156,647 | 11/1964 | Gould | 68—18 |
| 3,165,628 | 1/1965 | Araujo | 68—13 X |
| 3,194,628 | 7/1965 | Cannon | 68—13 X |
| 3,201,346 | 8/1965 | Benedict | 68—18 X |

FOREIGN PATENTS

| | | |
|---|---|---|
| 704,473 | 2/1931 | France. |
| 890,029 | 9/1953 | Germany. |

WILLIAM I. PRICE, *Primary Examiner.*